US010842307B1

(12) United States Patent
Shapiro-Wall

(10) Patent No.: US 10,842,307 B1
(45) Date of Patent: Nov. 24, 2020

(54) KITCHEN TOOL

(71) Applicant: Carolyn Shapiro-Wall, Gulfport, FL (US)

(72) Inventor: Carolyn Shapiro-Wall, Gulfport, FL (US)

(*) Notice: Subject to any disclaimer, the term of this patent is extended or adjusted under 35 U.S.C. 154(b) by 0 days.

(21) Appl. No.: 16/219,333

(22) Filed: Dec. 13, 2018

Related U.S. Application Data

(60) Provisional application No. 62/599,768, filed on Dec. 17, 2017.

(51) Int. Cl.
| | |
|---|---|
| *A47J 17/02* | (2006.01) |
| *A47J 17/10* | (2006.01) |
| *B26B 21/18* | (2006.01) |
| *B26B 11/00* | (2006.01) |
| *B26B 21/10* | (2006.01) |
| *B26B 13/22* | (2006.01) |

(52) U.S. Cl.
CPC ............. *A47J 17/02* (2013.01); *A47J 17/10* (2013.01); *B26B 11/00* (2013.01); *B26B 21/18* (2013.01); *B26B 13/22* (2013.01); *B26B 21/10* (2013.01)

(58) Field of Classification Search
CPC .. A47J 17/02; A47J 17/04; A47J 17/08; A47J 17/10; B26B 11/00; B26B 13/22
USPC ......... 30/123.5, 113, 279.2–279.6, 241–243; D7/393, 693–696
See application file for complete search history.

(56) References Cited

U.S. PATENT DOCUMENTS

| | | | | | |
|---|---|---|---|---|---|
| 966,496 | A | * | 8/1910 | Wagner | A47J 17/02 30/279.6 |
| 2,220,169 | A | * | 11/1940 | Murdock | A47J 17/02 D7/695 |
| 2,252,094 | A | * | 8/1941 | Palmer | A47J 17/02 30/279.6 |
| 2,450,346 | A | * | 9/1948 | Krilow | A47J 17/02 30/279.6 |
| 2,450,347 | A | * | 9/1948 | Krilow | A47J 17/02 30/279.6 |
| 2,450,348 | A | * | 9/1948 | Krilow | A47J 17/02 30/279.6 |

(Continued)

FOREIGN PATENT DOCUMENTS

| | | | | |
|---|---|---|---|---|
| DE | 29802221 U1 | * | 4/1998 | ............. A47J 17/02 |
| DE | 102004057838 A1 | * | 6/2006 | ............. A47J 17/02 |

(Continued)

OTHER PUBLICATIONS

"5.25" Bean Slicer—by NorproPrepare French-styled beans for mixed salads, casseroles, or creative side dishes with Norpro's Bean Slicer! This simple device is designed with stainless steel blades to effortlessly snap the ends of beans and remove the string, which creates a beautiful cut for visual appeal any dish. The product's small size gives the user excellent control and is ideal for storing. Norpro's Bean Slicer is perfect for preparing restaurant quality green beans!".

*Primary Examiner* — Jason Daniel Prone
(74) *Attorney, Agent, or Firm* — Werschulz Patent Law, LLC; Patricia P. Werschulz, Esq.

(57) ABSTRACT

A kitchen tool having a straight blade peeler, a gouge and a base having at least one blade for trimming a root or crown from a vegetable. The at least one blade can be within a cavity in the base or in a cavity at an end of a handle. In a further example embodiment, the at least one blade is a pair of blades configured as a scissors or as a chopper.

7 Claims, 11 Drawing Sheets

(56) References Cited

U.S. PATENT DOCUMENTS

| | | | | |
|---|---|---|---|---|
| 2,777,195 | A | * | 1/1957 | Dalianis .................. A47J 17/02 30/279.2 |
| 3,009,245 | A | * | 11/1961 | Senkewitz .............. A47J 17/02 30/279.6 |
| 3,114,277 | A | * | 12/1963 | Clendenin ............ H02G 1/1214 30/113 |
| 3,220,110 | A | * | 11/1965 | Popeil ..................... A47J 17/02 D7/695 |
| 3,621,899 | A | * | 11/1971 | Hula ........................ B26B 5/00 D7/695 |
| 4,592,140 | A | * | 6/1986 | Chasen ................... A47J 17/02 30/279.6 |
| 5,865,110 | A | * | 2/1999 | Yonezawa ............... A47J 17/02 30/279.6 |
| 6,076,260 | A | * | 6/2000 | Williamson, IV ...... A24F 13/26 30/113 |
| 6,336,271 | B1 | | 1/2002 | Rider et al. |
| 6,671,964 | B2 | * | 1/2004 | Ruiz ....................... A47J 17/02 30/123.5 |
| 7,340,836 | B2 | * | 3/2008 | Whitemiller ........... B26B 11/00 30/162 |
| 7,631,429 | B2 | * | 12/2009 | Chapman ................ A47J 17/02 30/279.6 |
| D675,488 | S | | 2/2013 | Prommel et al. |
| 8,596,173 | B2 | * | 12/2013 | Fung ....................... A47J 17/04 30/279.2 |
| 8,893,392 | B2 | * | 11/2014 | Sampaio ................. A47J 17/02 30/279.2 |
| D718,988 | S | * | 12/2014 | Szymanski ................... D7/695 |
| 10,104,998 | B2 | * | 10/2018 | Kent ....................... A47J 17/02 |
| 2004/0128841 | A1 | | 7/2004 | Prommel et al. |
| 2004/0216307 | A1 | | 11/2004 | Bitonto et al. |
| 2008/0287744 | A1 | | 11/2008 | Borodulin et al. |
| 2010/0064524 | A1 | * | 3/2010 | Mah ........................ A47J 17/02 30/123.5 |
| 2010/0269352 | A1 | | 10/2010 | Curtin |
| 2010/0269715 | A1 | | 10/2010 | Curtin |
| 2011/0167645 | A1 | | 7/2011 | Bagley et al. |
| 2012/0085249 | A1 | * | 4/2012 | Kuan ...................... A47J 17/02 30/123.5 |
| 2012/0222312 | A1 | | 9/2012 | Bordas |
| 2013/0305935 | A1 | * | 11/2013 | Ebrahim ................. A47J 17/02 30/123.5 |
| 2014/0230253 | A1 | * | 8/2014 | Ancsel .................... A47J 17/02 30/123.5 |
| 2015/0075012 | A1 | * | 3/2015 | Opinel .................... A47J 17/02 30/295 |
| 2015/0079258 | A1 | | 3/2015 | Szymanski |
| 2016/0066735 | A1 | | 3/2016 | Kent |
| 2019/0069704 | A1 | * | 3/2019 | Montigny ............... A47J 17/02 |

FOREIGN PATENT DOCUMENTS

| | | | | |
|---|---|---|---|---|
| DE | 102006021085 B3 | * | 8/2007 | ............ B26B 11/00 |
| DE | 102010028178 A1 | * | 10/2011 | ............ A47J 17/02 |
| EP | 1018305 A3 | * | 5/2001 | ............ A47J 17/08 |
| WO | WO-2012060706 A1 | * | 5/2012 | ............ A47J 17/02 |

* cited by examiner

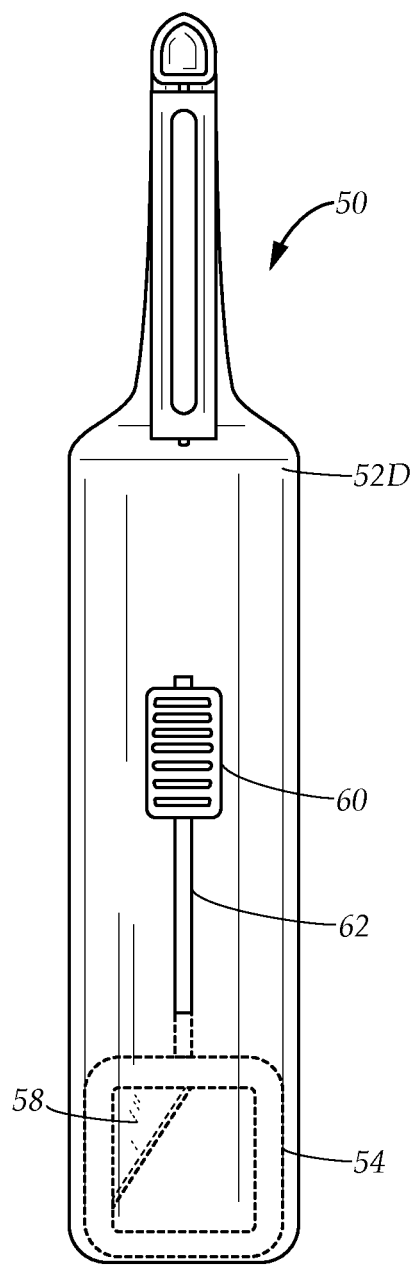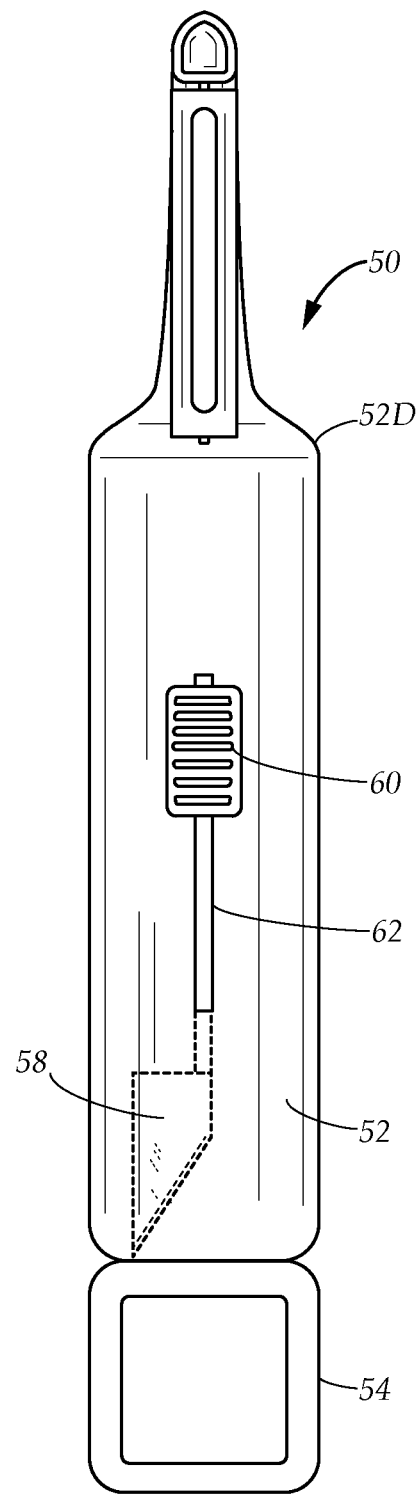
FIG. 4B
FIG. 4C

KITCHEN TOOL

CROSS-REFERENCE TO RELATED APPLICATIONS

This application is a nonprovisional utility application of the provisional patent application, Ser. No. 62/599,768, filed in the United States Patent Office on Dec. 17, 2017 and claims the priority thereof and is expressly incorporated herein by reference in its entirety.

TECHNICAL FIELD

The present disclosure relates generally to a tool. More particularly, the present disclosure relates to a multipurpose kitchen tool.

BACKGROUND

Preparing vegetables for cooking or for eating raw may require several tools, such as a peeler, a knife, a gouge kitchen shears and a cutting board. Cooking or eating many raw vegetables, such as potatoes, carrots, parsnips, and turnips require removing the outer skin or peel. The roots on these vegetables must be trimmed with a knife or kitchen shears. The collar and stem of carrots and parsnips must be trimmed also. The buds or "eyes" of potatoes are removed with a gouge or a knife.

Because it may take multiple tools to prepare a vegetable or fruit, it is time consuming to constantly switch back and forth between them. The other challenge to the cook is that prolonged gripping of these tools becomes uncomfortable.

While these tools may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a kitchen tool useful for peeling a plurality of vegetables and cutting off a root. Accordingly, an aspect of an example embodiment in the present disclosure provides a kitchen tool having a straight blade peeler and at least one blade configured for cutting off a root.

Another aspect of an example embodiment in the present disclosure is to provide a kitchen tool for trimming a vegetable. Accordingly, the present disclosure provides a kitchen tool having a cavity with a pair of blades within a base configured for trimming a vegetable.

Yet another aspect of an example embodiment in the present disclosure is to provide a kitchen tool for removing a root from a vegetable. Accordingly, the present disclosure provides a kitchen tool having a handle with a pair of blades at an end of the handle configured for cutting a root from a vegetable.

Yet a further aspect of an example embodiment in the present disclosure is to provide a kitchen tool for removing a collar and a stem from a vegetable. Accordingly, the present disclosure provides a kitchen tool having a cavity with a blade at an end of a base configured for removing a collar and a stem from a vegetable.

Accordingly, the present disclosure describes a kitchen tool having a straight blade peeler, a gouge and a base having at least one blade for trimming a root or crown from a vegetable. The at least one blade can be within a cavity in the handle or in a cavity at an end of a base. In a further example embodiment, the at least one blade is a pair of blades configured as a scissors or as a slicer.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

FIG. 4B, similar to FIG. 4A, is a front elevational view of yet another example embodiment of the kitchen tool with a frame with a blade therein in a deployed position.

FIG. 4C, similar to FIG. 4B, is a front elevational view of yet another example embodiment of the kitchen tool with the blade in a retracted position.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1A:
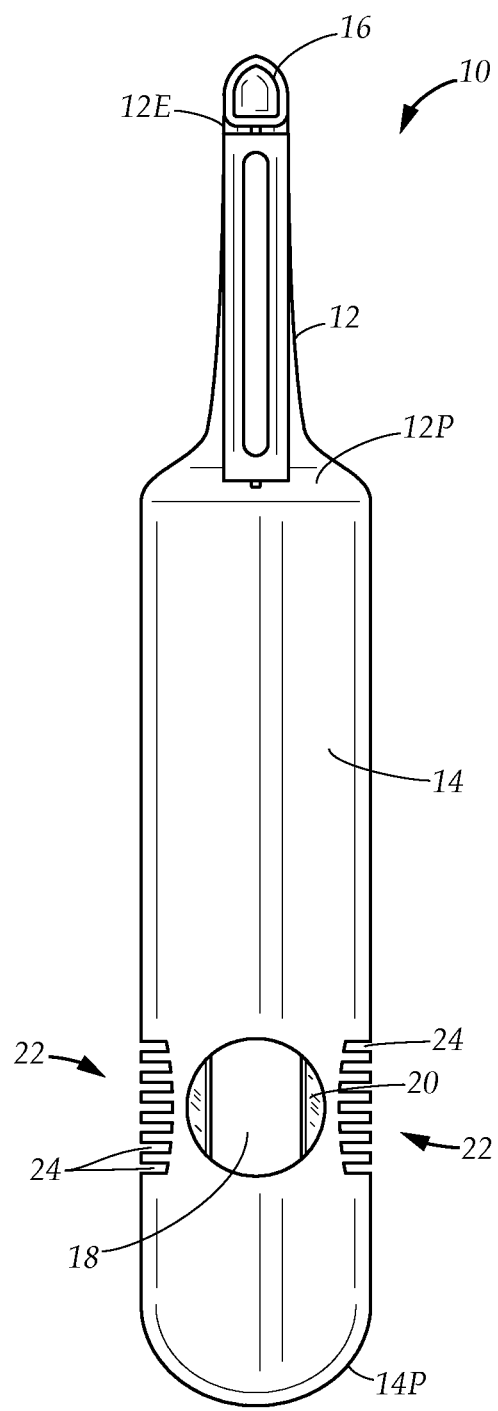
FIG. 1A is a front elevational view of an example embodiment of a kitchen tool.

FIG. 1A illustrates an example embodiment of a kitchen tool 10 having a straight blade peeler 12, a gouge 16 at a distal end 12E of the straight blade peeler 12 and a handle 14 at a proximal end 12P of the straight blade peeler. Within the handle 14 is a cavity 18 towards a proximal end 14P of the handle, having a pair of blades 20 therein.

On the handle 14, adjacent to the cavity 18, is a squeezable portion 22 of the handle that is resilient, responding to pressure. The squeezable portion 22 has a plurality of indentations 24 that permit the portion to be squeezed.

Figure 1B:
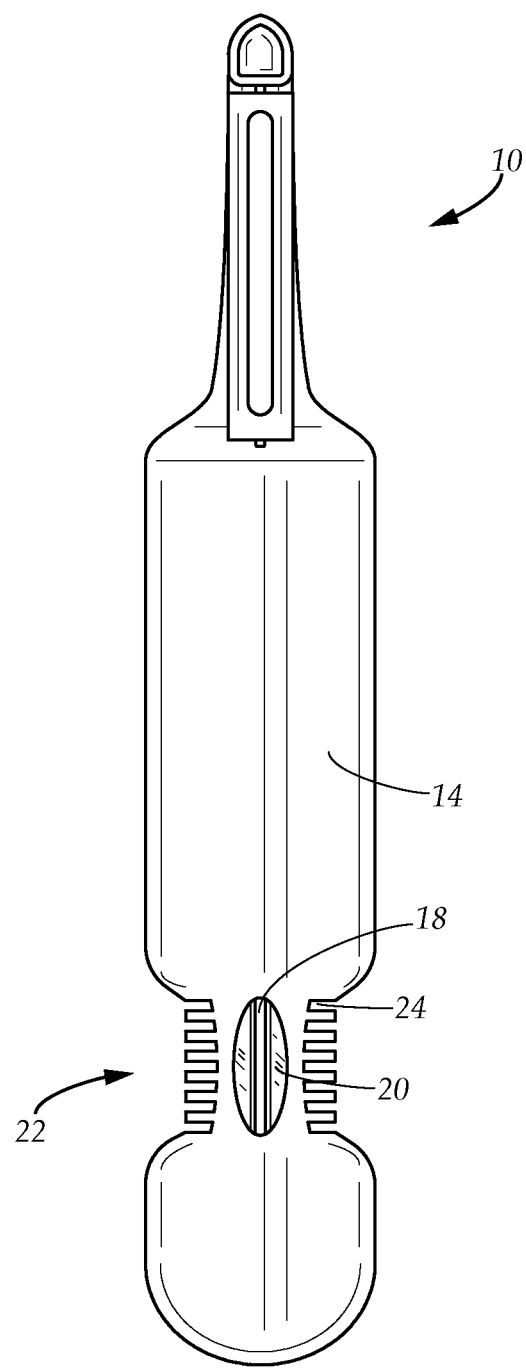
FIG. 1B, similar to FIG. 1A, is a front elevational view of the example embodiment of a kitchen tool with a pair of blades deployed.

In FIG. 1B, similar to FIG. 1A, shows the portion 22 squeezed together such that the blades 20 move together, configured for cutting any object placed in the cavity 18. In FIG. 1A, the squeezable portion 22 and aperture is towards the proximal end 14P of the handle 14.

Figure 2:
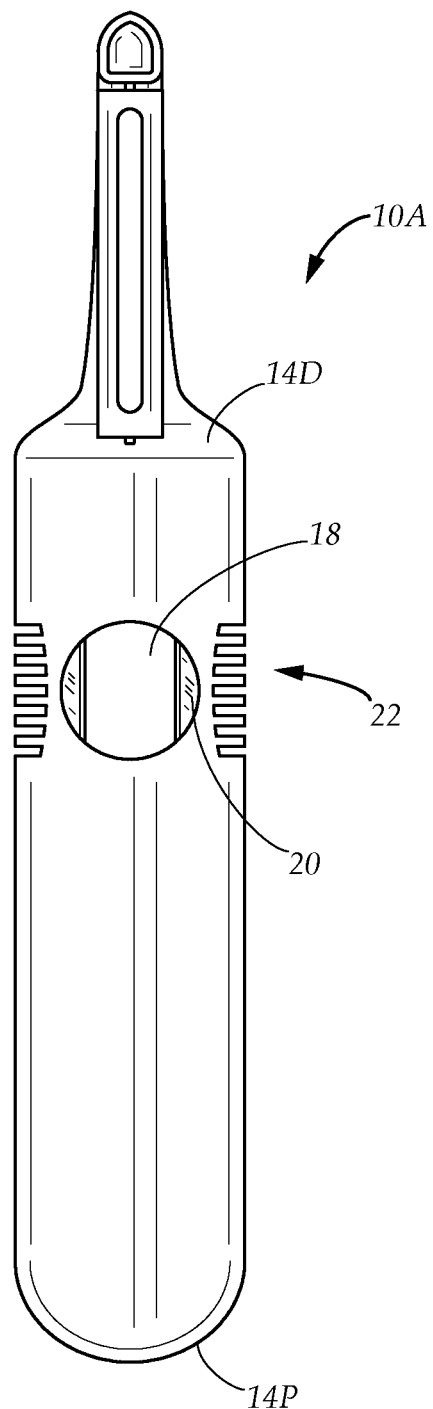
FIG. 2 is a front elevational view of another example embodiment of a kitchen tool.

An example embodiment of a kitchen tool 10A in FIG. 2 is similar to FIG. 1A, having the straight blade peeler 12, the gouge 16 and the handle 14, but the cavity 18 and squeezable portion 22 is positioned towards the distal end 14D of the handle 14.

Figure 3A:
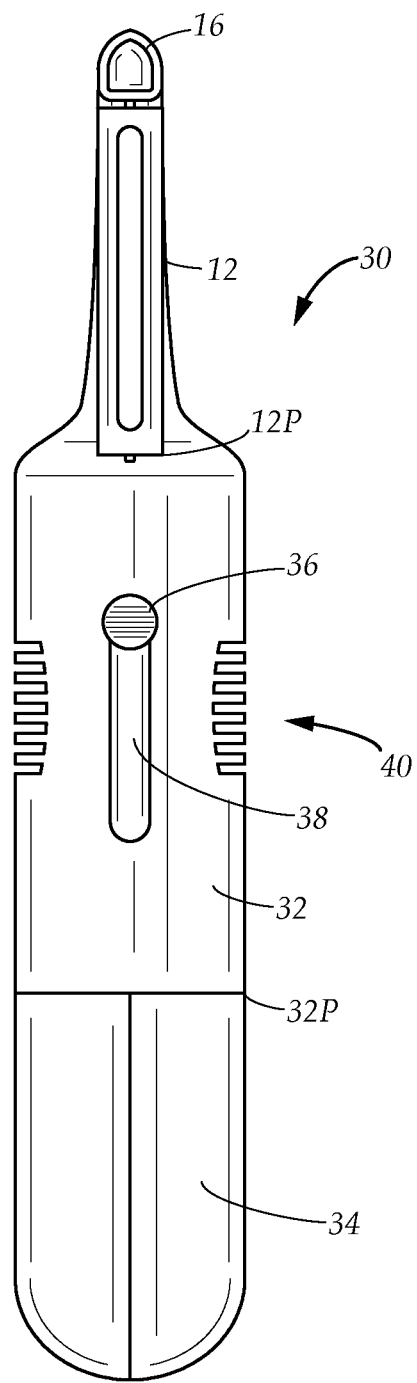
FIG. 3A is a front elevational view of a further example embodiment of a kitchen tool.

FIG. 3A shows another example embodiment of a kitchen tool 30 having a straight blade peeler 12 and a gouge 16 and a handle 32 at the proximal end 12P of the straight blade peeler 12. On the proximal end 32P of the handle 32, is a pair of blades 34. The blades 34 are locked in a closed position for safety, but are unlocked by a release 36 within a slot 38. Similar to the example embodiments described hereinabove, the handle has a squeezable portion 40 as described hereinabove.

Figure 3B:
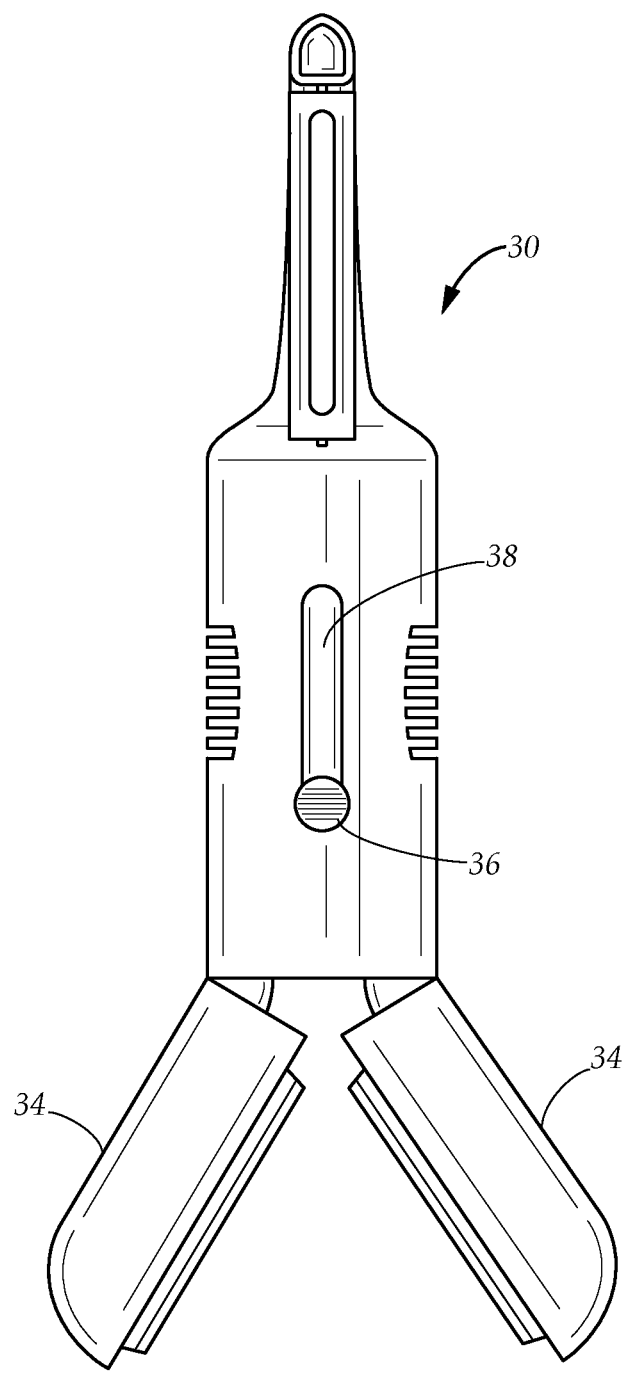
FIG. 3B, similar to FIG. 3A, is a front elevational view of the further example embodiment of the kitchen tool with a pair of blades in an unlocked position.

FIG. 3B shows the kitchen tool 30 unlocked with the release 36 moved within the slot 38. It is understood by those of ordinary skill in the art the drawings show the release at a first end for locking and a second end for unlocking. Assignment of the position for locking and unlocking is arbitrary and not a limitation. When the kitchen tool 30 is unlocked, the blades 34 separate.

Figure 3C:
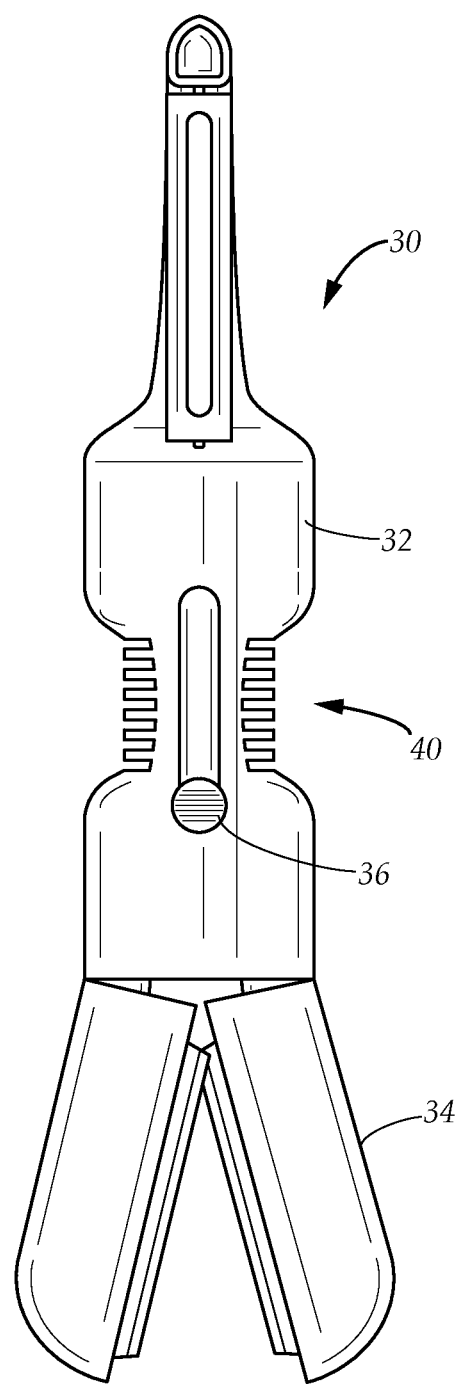
FIG. 3C, similar to FIG. 3B, is a front elevational view of the further example embodiment of the kitchen tool with the pair of blades closing.

FIG. 3C shows the kitchen tool 30 with the release 36 in the unlocked position, the squeezable portion 40 engaged in the handle 32. The squeezable portion is configured to operate the blades 34. Squeezing the squeezable portion 40 causes the blades 34 to close, thereby cutting any object placed between the blades. Releasing the squeezable portion 40 causes the blades 34 to open. Moving the release 36 to the lock position causes the blades 34 to close and lock as shown in FIG. 3A.

Figure 4A:
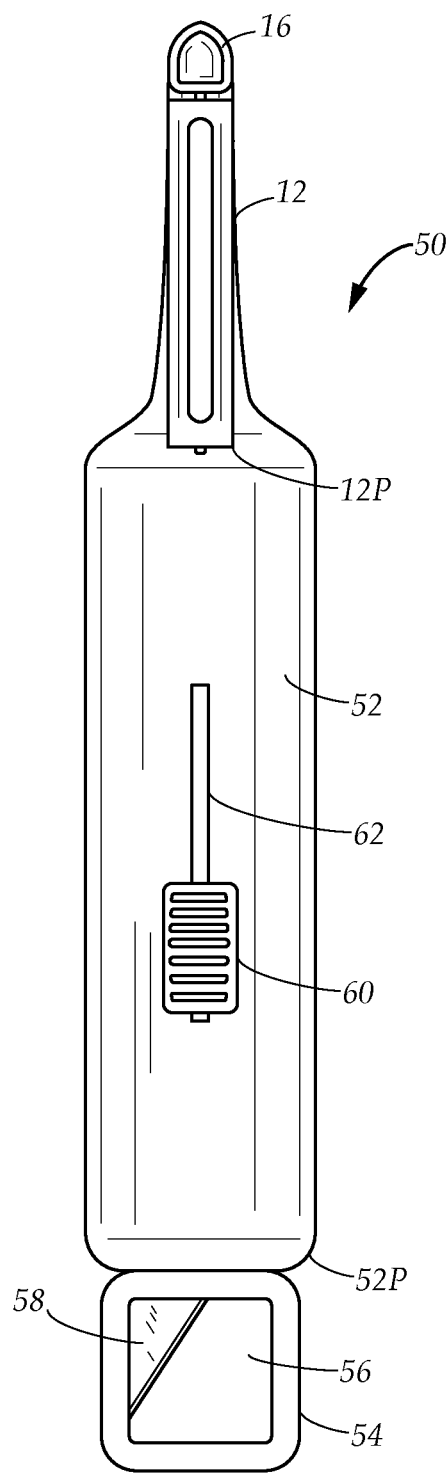
FIG. 4A is a front elevational view of a yet another example embodiment of a kitchen tool.

FIG. 4A demonstrates yet another example of a kitchen tool 50 having a straight blade peeler 12 and a gouge 16 and a handle 32 at the proximal end 12P of the straight blade peeler 12. The kitchen tool 50 has a handle 52 having a loop 54 forming a cavity 56 with a blade 58 therein at a proximal end 52P of the handle.

In the handle 52, is a catch 60 that moves along a slit 62. When the catch 60 moves downwardly towards the proximal end 52P of the handle 52, the blade 58 moves through the cavity 56 of the loop 54, cutting any object in the cavity.

FIG. 4B shows the catch 60 moving upwardly towards a distal end 52D of the handle 52. As the catch 60 moves upward, the loop 54 and deployed blade 58 begins to retract within the handle 52. In FIG. 4C, showing another example embodiment of the kitchen tool 50, the catch 60 moves upward toward the distal end 52D of the handle and the blade 58 retracts within the handle. The loop 54 remains external to the handle 52.

Figure 5A:
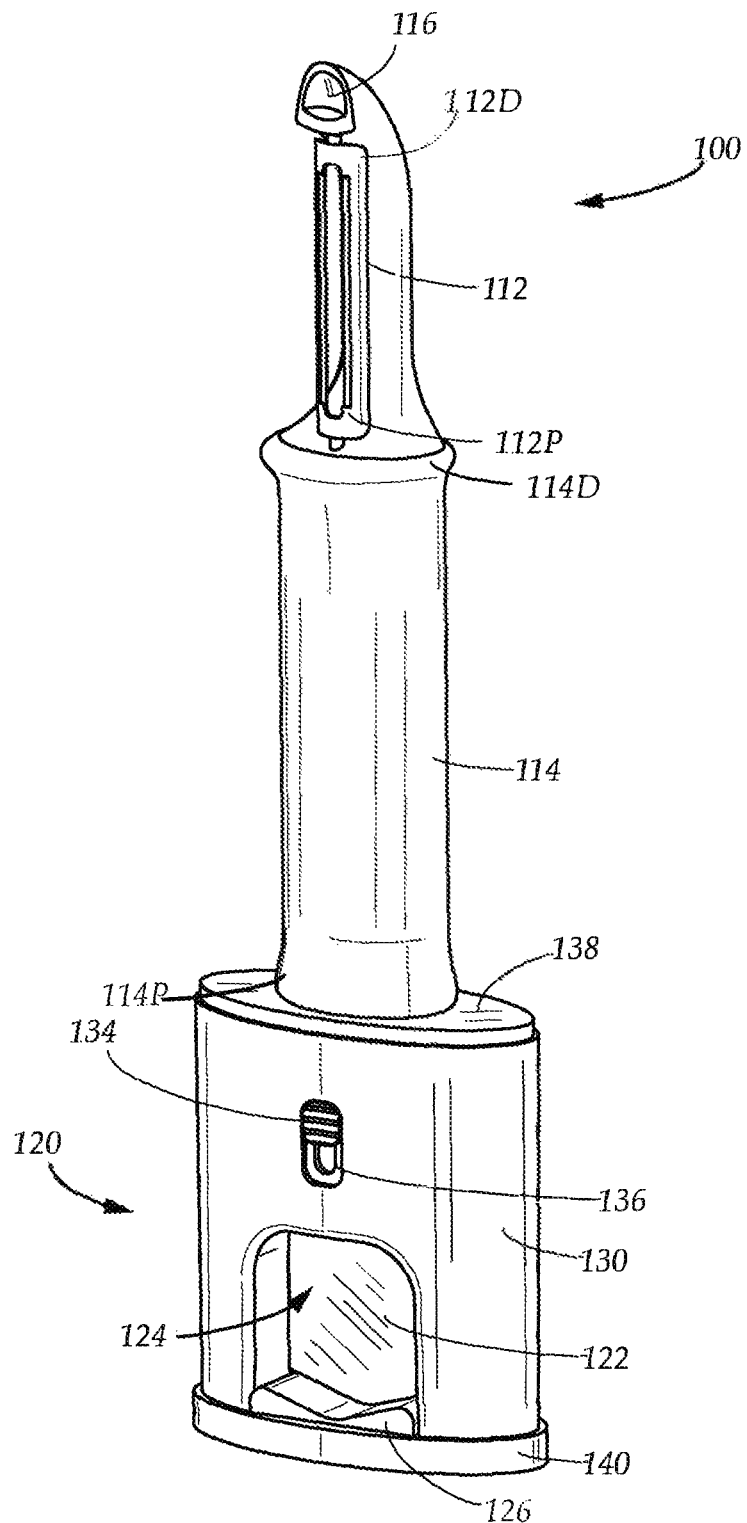
FIG. 5A is a perspective view of a further example embodiment of the kitchen tool with a blade therein a deployed position.
Figure 5B:
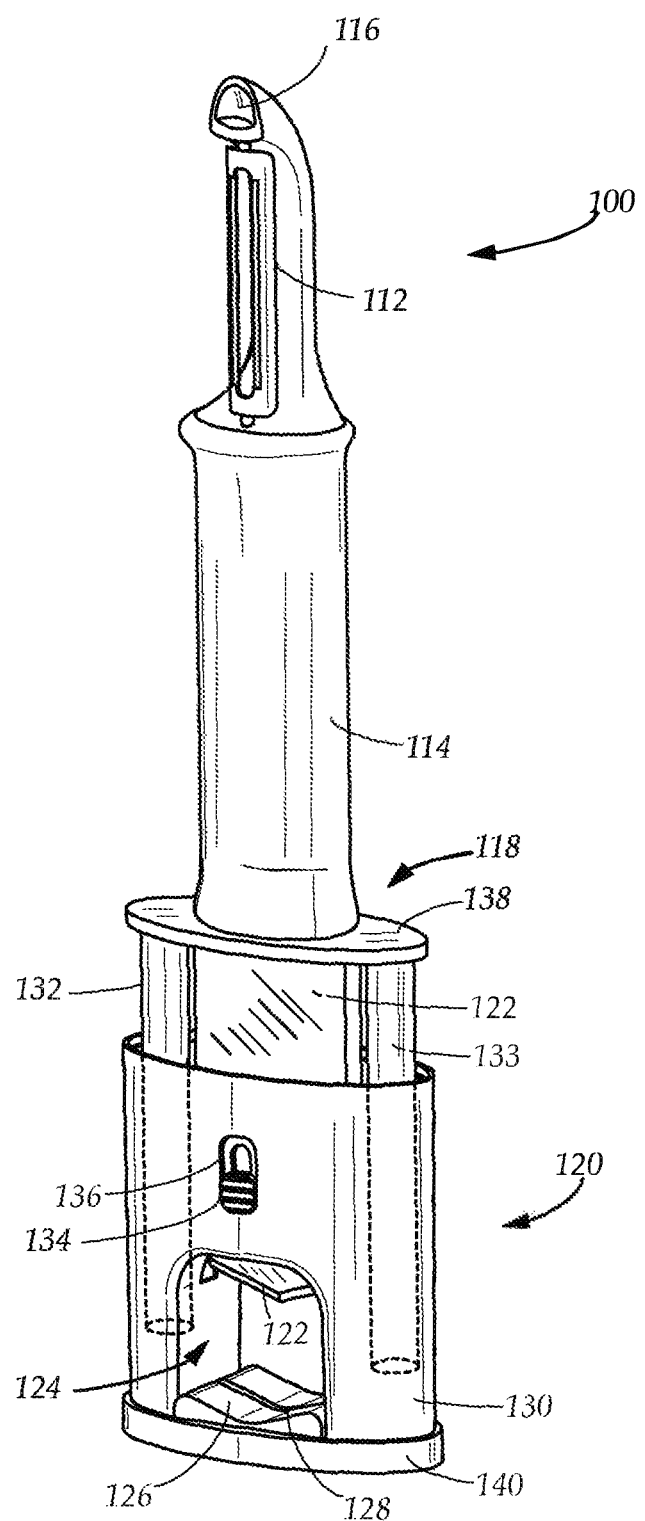
FIG. 5B, similar to FIG. 5A, is a perspective view of the further example embodiment of the kitchen tool with the blade therein in a retracted position.
Figure 5C:
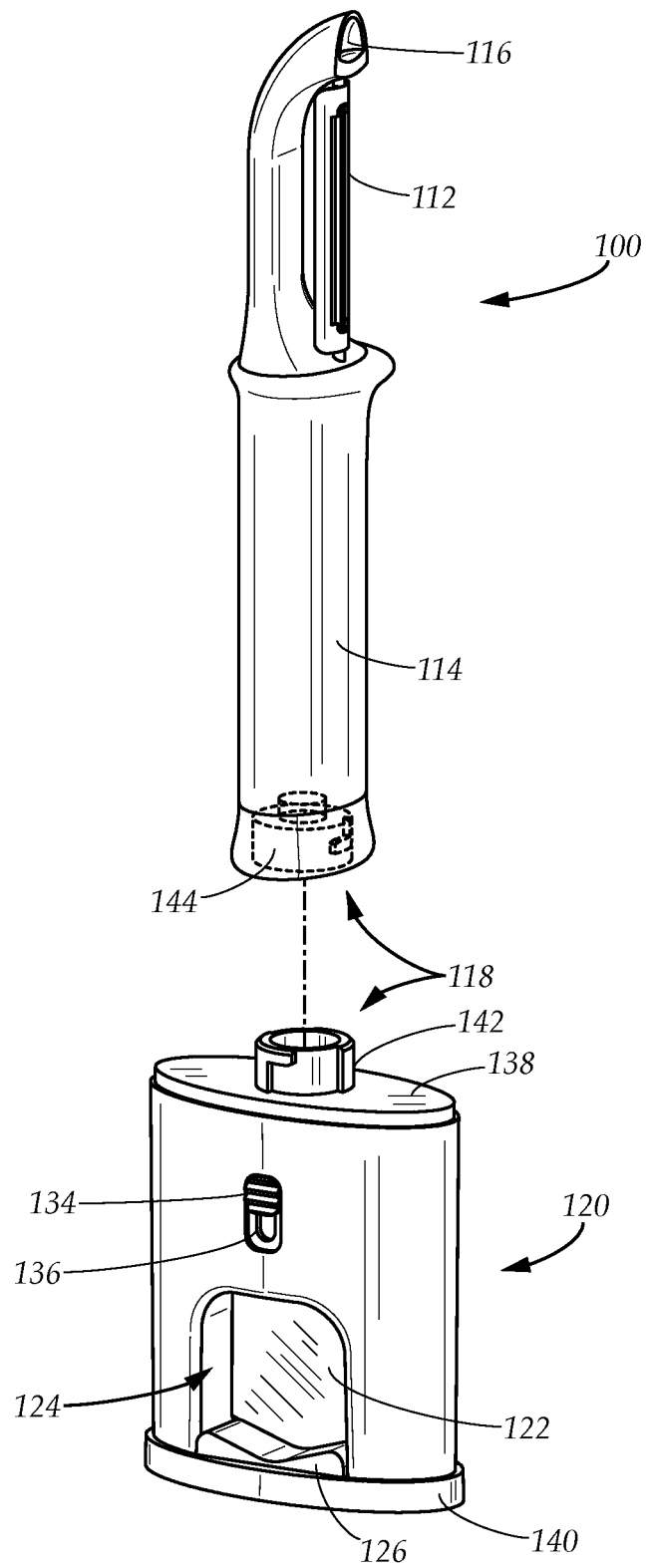
FIG. 5C, similar to FIG. 5A, is a perspective view of the further example embodiment of the kitchen tool with the blade therein in a deployed position and a peeler detaching from the kitchen tool.

A further example embodiment of the kitchen tool 100 is illustrated in FIGS. 5A-5C. The kitchen tool has a handle 114 having a proximal end 114P and a distal end 114D, a straight blade peeler 112 having a distal end 112D with a gouge 116 and a proximal end 112P attaching to the distal end 114D of the handle 114. The kitchen tool has a base 120 with a bottommost cavity 124 with a retractable blade assembly 122 within the cavity, the base 120 attaching to the proximal end of the handle 114.

The base 120 has an outer sleeve portion 130 with the bottommost cavity 124 therein. The base 120 has a sliding inner portion 132, the blade assembly 122 attaching to the sliding inner portion such that when the sliding inner portion slides within the outer sleeve portion 130, the blade assembly moves within the cavity 124.

The sliding inner portion 132 has a top platform 138, the blade assembly 122 attaching below the top platform and at least one guide 133 attaching to the top platform 138 maintaining the blade assembly 122 within the cavity 124 of the outer sleeve portion 130 as the inner portion 132 slides within the outer sleeve portion. There is a blade rest 126 at a bottom of the cavity 124, the blade rest engaging the blade assembly 22 when the blade assembly extends fully into the bottommost cavity 124. A foot 140 attaches below the base 120, the base disposed inside the foot. The blade rest 126 is disposed on the foot 140. The blade rest 126 has a slit 128 that accommodates the blade assembly 122 when the blade assembly lowers onto the blade rest 126.

The handle 114 selectively attaches to the base 120 by an interlocking assembly 118. The proximal end 114P of the handle 114 has a female interlocking assembly 144 and the top platform 138 of the base 120 has a male interlocking assembly 142. The male interlocking assembly 142 engages the female interlocking assembly 144 of the handle, allowing the handle 114 to selectively attach to the base 120 as well as selectively detach from the base by disengaging the male interlocking assembly from the female interlocking assembly. The straight blade peeler 112 and handle 114 are functional after detaching from the base 120 as an ordinary peeler. It is understood by those of ordinary skill in the art that the addition of a simple handle to the base 120 allows the blade assembly to be functional after the straight blade peeler 112 and handle 114 detaches. The kitchen tool 100 easily converts into two separate tools, a peeler and blade for cutting.

The base 120 has a latch 134 with a slot 136, the latch selectively locking the blade assembly 122 in a deployed position within the cavity 124. The handle 114 is detachable from the base 120 when the latch 134 locks the blade assembly 122 in a deployed position within the cavity 124.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a kitchen tool. The disclosure is illustrated by example in the drawing figures, and throughout the written description. It should be understood that numerous variations are possible, while adhering to the inventive concept. Such variations are contemplated as being a part of the present disclosure.

What is claimed is:

1. A kitchen tool, comprising:
    a handle having a proximal end with a first interlocking assembly and a distal end;
    a straight blade peeler having a distal end with a gouge and a proximal end disposed on the distal end of the handle; and
    a base defining a bottommost cavity, the base having a top platform with a second interlocking assembly, the base attaching to the proximal end of the handle by the second interlocking assembly on the top platform of the base engaging the first interlocking assembly on the proximal end of the handle;
    a retractable blade assembly disposed within the base, attaching to a bottom of the top platform of the base, the retractable blade assembly selectively extending into the bottommost cavity of the base.

2. The kitchen tool as described in claim 1, wherein the base has an outer sleeve portion defining the bottommost cavity within the outer sleeve portion.

3. The kitchen tool as described in claim 2, wherein the base has a sliding inner portion attaching to and disposed below the top platform, the sliding inner portion sliding within the outer sleeve portion as the retractable blade assembly extends into the bottommost cavity of the outer sleeve portion.

4. The kitchen tool as described in claim 3, wherein the sliding inner portion has at least one guide attaching to and disposed below the top platform maintaining the retractable blade assembly within the cavity of the outer sleeve portion as the sliding inner portion slides within the outer sleeve portion.

5. The kitchen tool as described in claim 4, wherein there is a blade rest at a bottom of the bottommost cavity, the blade rest engaging the retractable blade assembly when the retractable blade assembly extends fully into the bottommost cavity.

6. A kitchen tool, comprising:
    a handle having a proximal end and a distal end, the proximal end having a female interlocking assembly;
    a straight blade peeler having a distal end with a gouge and a proximal end disposed on the distal end of the handle; and
    a base having a distal end and a top platform disposed thereon, the base defining a bottommost cavity, the base having a retractable blade assembly sliding within the bottommost cavity, the top platform having a male interlocking assembly on the opposing side of the retractable blade assembly, the male interlocking assembly engaging the female interlocking assembly on the proximal end of the handle.

7. The kitchen tool as described in claim 6, wherein the handle selectively detaches from the base by disengaging the female interlocking assembly of the handle from the male interlocking assembly of the base.

* * * * *